United States Patent Office 3,060,147
Patented Oct. 23, 1962

3,060,147
POLYESTER RESIN COMPOSITIONS
John C. Schlegel, Jr., Northford, Conn., assignor to American Cyanamid Company, New York, N.Y., a corporation of Maine
No Drawing. Filed May 3, 1961, Ser. No. 107,308
18 Claims. (Cl. 260—45.4)

This invention relates to novel resinous compositions of matter. More particularly, this invention relates to novel resinous compositions of matter comprising a reactive, ethylenically unsaturated, linear polyester resin, an ethylenically unsaturated monomeric cross-linking agent therefor, and a diglycidyl ester of a dicarboxylic acid, to the process of curing these polymerizable compositions to an insoluble and infusible state, and to the insoluble and infusible resinous compositions of matter thereby obtained.

This application is a continuation-in-part of my copending applications Serial No. 738,619, filed May 29, 1958, and Serial No. 744,041, filed June 24, 1958, now abandoned.

It is an object of this invention to prepare improved polymerizable compositions of matter.

This invention further has as its object the preparation of resinous compositions which, in the cured state, exhibit improved chemical and physical properties compared to those possessed by conventional related resinous compositions.

Another object of this invention is to provide a novel class of laminating and adhesive resins by polymerizing a reactive, ethylenically unsaturated, linear polyester resin and a compound containing a $CH_2=C<$ group in the presence of a diglycidyl ester of a dicarboxylic acid.

These and other objects of this invention will be apparent to those skilled in the art, especially upon consideration of the discussion and examples presented hereinbelow.

Polyester resins are well known in the art. They are generically described as resinous reaction products resulting from the conjoint polymerization of an ethylenically unsaturated monomeric cross-linking agent, such as styrene, with a reactive, ethylenically unsaturated, linear polyester resin, generally referred to as a polymerizable or reactive polyester resin, which is usually obtained by condensing an $\alpha,\beta$-ethylenically unsaturated polycarboxylic acid or anhydride, such as maleic anhydride, and a polyol, generally a dihydric alcohol such as ethylene glycol.

Polyester resins have achieved significant commercial importance in such diverse applications as laminates, adhesives, moldings, surface coatings and castings, and particularly in the first two fields stated. However, despite the generally satisfactory properties exhibited by conventional cured polyester resin compositions there exists, nevertheless, a demand for improvement in certain beneficial properties of these resins, and especially for improvement in those properties which are associated to a significant extent with a high degree of curing or cross-linking in the cured resin. For example, there is a need for improved polyester resins having bonding or adhesive capabilities over and above those which can be obtained by the use of the known polyester resin compositions. Similarly, in the field of laminates, improvement in the chemical resistance of the cured product is required for many special applications. The practice of my invention enables one to realize such improvements, particularly in the case of adhesive and laminating applications. Additionally, the practice of my invention provides, as will be evident to those skilled in the art, a plurality of other advantages which cannot be realized by the use of the polyester resin compositions exemplified in the prior art.

Prior art polyester resin compositions which have been modified by the addition thereto of ethoxyline resins provide a case in point. The ethoxyline resins are complex resins comprising polyether derivatives of polyhydric phenols, wherein the final resinous condensates contain terminal epoxy groups. They are conventionally prepared by condensing a dihydric phenol, such as bisphenol, with an epihalohydrin, such as epichlorohydrin. While it is known that polymerizable mixture of ethoxyline resins with polyester resin compositions are capable of providing cured products having certain improved properties, it is also known that certain disadvantages result from the use of such mixtures.

One of these disadvantages stems from the fact that the ethoxyline resin components accentuate the cured compositions' susceptibility to electrophilic attack. It is known that an ether oxygen proximately connected to an aromatic ring, such as is found, for example, in the structural configuration of the ethoxyline resins, decreases the electron density of the aromatic ring structure, and it is believed that this decrease in electron density lessens the stability of the aromatic ring with respect to chemical degradation or cracking, particularly in the presence of acidic catalysts or media of the type conventionally associated with polyester resinous compositions. The most pronounced manifestation of cracking or degradation of the aromatic ring is the undesirable darkening of the resin which usually occurs subsequent to final cure but which may occur progressively during curing.

I have now discovered improved polymerizable polyester resin compositions which are capable of providing highly cured polyester resins but which avoid the undesirable features associated with the use of ether resins such as the ethoxyline resins for this purpose. In accordance with the present invention, these improved polyester resin compositions are obtained by the inclusion, in a conventional polymerizable polyester resin composition, of a diglycidyl ester of a dicarboxylic acid.

The use of the diglycidyl esters of this invention to modify polyester resin compositions obviates, to a large extent, the deleterious discoloration resulting from the use of ether resin modifiers such as the ethoxyline resins, whether the particular diglycidyl ester employed be aliphatic or aromatic. Thus, even in the case of the instant aromatic diglycidyl esters, e.g., the diglycidyl esters of the various phthalic acids or the diglycidyl esters of the various alkylidenedibenzoic acids, the esterified carboxyl substituent increases the electron density of the aromatic ring structure, and it is believed that this in turn provides the aromatic ring with a higher degree of resistance to chemical degradation or cracking, thus markedly decreasing any tendency towards discoloration.

The polymerizable polyester resin compositions of the present invention reach the state of total cure in two stages. While I do not wish to be bound by any particular theory or reaction mechanism advanced to explain the operation of this invention, it is believed that in curing such compositions the reactive polyester resin component is initially cross-linked by copolymerization with the ethylenically unsaturated monomeric component, with the diglycidyl ester component then effectively serving to further cross-link the initial copolymerization product into an extremely complex resin network. Furthermore, the diglycidyl ester component is believed to react in a particular manner. The reactive polyester resins which are employed in the compositions of the present invention contain reactive, uncondensed carboxyl groups. These carboxyl groups are not affected by the initial copolymerization reaction, and since an epoxy group is capable of reacting with a carboxyl group, it is believed that substantially all of the cross-linking effected by the diglycidyl ester component is the result of reaction between the epoxy groups of the diglycidyl ester and the residual carboxyl groups of the initial copolymerization product. It should be noted in this connection that due to the fact that reaction conditions more drastic than those required to accomplish the initial copolymerization reaction are necessary to effect substantial reaction between the carboxyl and epoxy groups, this second stage reaction involving the diglycidyl ester essentially takes place subsequent to the initial copolymerization reaction, as will be described in greater detail hereinbelow.

In addition to achieving improved properties in the cured compositions of this invention, other significant advantages are obtained by employing my particular type of epoxy group-containing compounds. Since these diglycidyl esters of dicarboxylic acids are readily soluble or compatible with the conventional unmodified polyester resin compositions, they permit the preparation of polymerizable formulations having desirable viscosity characteristics, whereas prior art compositions containing an epoxide component are generally inferior in this regard. Also, because the diglycidyl esters of this invention are readily compatible with all of the reactive polyester resins employed in conventional polyester resin compositions, as well as with the copolymers thereof, there is no likelihood that the cured products obtained will exhibit a two-phase or incompatible system. Although it is possible that in certain instances all of the diglycidyl ester employed will not completely co-react with the initial copolymerization product, nevertheless, any amount not co-reacting will remain as a component compatible with the co-reaction products. Furthermore, it is probable that any amount of diglycidyl ester which will not react with the initial copolymeriaztion product will itself polymerize and remain as a homopolymeric component imparting beneficial properties to the cured composition.

As previously indicated, the reactive polyester resins which may be used in the polyester resin compositions to which the present invention is directed can be generically described as resinous reaction products of polycarboxylic acids and polyhydric alcohols. Esterification products of this type which have found widespread use in polyester resin compositions are essentially linear resins containing a plurality of ethylenically unsaturated linkages. Preferably, they are obtained by esterifying an α,β-ethylenically unsaturated polycarboxylic acid with a saturated polyhydric alcohol.

These reactive polyester resins are generally formulated so that the esterifying mixture contains approximately a stoichiometric balance between carboxyl and hydroxyl groups. Thus, where a diol and dicarboxylic acid are used, they are reacted on an approximate mol to mol basis. In commercial practices for preparing these resins, a small excess of polyol, usually in the neighborhood of about 10%, is employed, primarily for economical considerations, e.g., to assure a rapid esterification rate or to keep cross-linking at a minimum. Conventional polyester resins of this type having rather high acid numbers, e.g., above about 50, are preferred in the practice of the present invention. However, I am not limited to the use of such resins.

It is generally felt in the resin art that a reactive polyester resin must have a certain average degree of polymer chain length in order for the cured polymerization product, i.e., the copolymerization product of the reactive polyester resin with an ethylenically unsaturated monomer, to meet certain minimum requirements with respect to mechanical strength properties and the like. The reactive polyester resins that may be used in the practice of the present invention, however, do not necessarily have to be highly polymeric in nature. As a matter of fact, very suitable products may be obtained from polyester resin compositions wherein the reactive polyester resin is an esterification product of one mol of a diol with two mols of a dibasic acid. Low molecular weight reactive polyester resins may be employed in the practice of the present invention due to the fact that once the monomeric cross-linking agent has copolymerized with the reactive polyester resin, the resulting copolymer molecules are subsequently linked together in a complex resin network during the second or post-curing stage of the curing process through the medium of the diglycidyl esters employed in the composition. Ordinarily, in curing conventional polyester resin compositions, there is no significant amount of further condensation once the initial copolymerization reaction has taken place, even though the composition is potentially capable of undergoing further condensation or esterification, due to the fact that it is impractical to operate under conditions which would facilitate further esterification.

As indicated above, reactive polyester resin starting materials may be prepared from esterifiable compositions which contain only one equivalent of a diol to two equivalents of a dicarboxylic acid and which, under conventional conditions, provide esterification products characterized by a relatively high acidity and a comparatively low molecular weight in comparison with conventional reactive polyester resins. The most satisfactory reactive polyester resins which may be used in the improved polymerizable polyester resin compositions of the present invention are prepared from esterification mixtures containing one equivalent of a diol to one and one-half equivalents of a dicarboxylic acid.

In the description of the reactive polyester resin starting materials given above, the polyol is referred to as a diol. This is done primarily for convenience in illustrating the nature of the condensation products which may be employed. While diols are preferred in preparing these compositions, it is not mandatory that all of the polyol employed be a diol; small amounts, usually up to about 20%, of a polyol having more than two hydroxyl groups may be employed if desired. Among the dihydric alcohols which may be employed are saturated aliphatic diols such as ethylene glycol, diethylene glycol, propylene glycol, dipropylene glycol, butanediol-1,2, butanediol-1,3, butanediol-1,4, pentanediol-1,2, pentanediol-1,3, pentanediol-1,4, pentanediol-1,5, hexanediol-1,6, and the like. Among the polyhydric alcohols having three or more hydroxyl groups which may be employed in minor amounts together with the above-mentioned diols are glycerol, pentaerythritol, dipentaerythritol, trimethylolethane, trimethylolpropane, sorbitol, mannitol, and the like.

The use of α,β-ethylenically unsaturated dicarboxylic acids or their anhydrides provides a convenient and preferred method of introducing ethylenic unsaturation into the reactive polyester resins. Among the acids of this type which may be employed are maleic, monochloromaleic anhydride, fumaric, aconitic, itaconic, and the like. Non-polymerizable dicarboxylic acids may also be employed if used in combination with an α,β-ethylenically unsaturated dicarboxylic acid. A nonpolymerizable acid, if used, should not constitute more than 80% of the total equivalents of carboxyl groups. Among the non-polymerizable dicarboxylic acids which may be used in the manner described are, for instance, phthalic, isophthalic, the various chlorinated phthalic acids, succinic, adipic, azelaic, sebacic, and the like. Whenever available, the anhydrides of these acids may be substituted therefor in whole or in part.

The reactive polyester resin components of the instant polyester resin compositions may be formed in the manner customarily observed in esterifying the particular polycarboxylic acid or acids with the particular polyhydric alcohol or alcohols, i.e., at elevated temperatures and atmospheric pressure, although pressures slightly above or below atmospheric may be employed if desired. The temperature at which this esterification reaction is carried out is not critical, and the optimum temperature is usually just below the boiling point of the most volatile component of the reaction mixture, which is generally the polyol employed. However, temperatures in excess of the boiling point of the lowest boiling component of the reaction may be used if care is taken to provide the reaction vessel with a steam heated reflux condenser, which will permit the water of esterification to escape from the reaction mixture while condensing volatilized components and returning them to the reaction mixture.

Since resinifying reactants of the type in question are prone to develop color when in contact with air at elevated temperature, it is generally good practice to conduct the esterification reaction in an inert atmosphere, such as that obtained by bubbling an inert gas such as carbon dioxide or nitrogen through the esterifying mixture. Further details pertaining to the preparation of these reactive polyester resins as well as to their copolymerization with ethylenically unsaturated monomeric cross-linking agents are disclosed in Ellis U.S. Patent No. 2,255,313, and Kropa U.S. Patents No. 2,443,735 to 2,443,741, inclusive.

The esterification products which are particularly useful in the practice of the present invention are those wherein the dicarboxylic acid reactant has been reacted to utilize substantially all of the hydroxyl groups present in the reaction mixture. Thus, these esterification products may exhibit a very high acid number, such as is obtained when one reacts two mols of a dicarboxylic acid with one mol of a diol. Where the reactive resin is formulated on the basis of an equivalent of carboxylic acid to an equivalent group, such as exemplified by conventional reactive polyester resin formulations, esterification may be carried out to an acid number as low as approximately 50, whereby the bulk of the available hydroxyl groups are esterified. On the other hand, the esterification reaction may be terminated at any degree of condensation represented by an acid number of approximately 200 or less. As mentioned previously, it is not necessary that the reactive polyester resins which are employed in the compositions of the present invention be highly polymeric in nature.

The ethylenically unsaturated monomeric cross-linking agent which is copolymerized with the reactive polyester resin to provide the initial copolymerization product referred to above is a polymerizable material containing a $CH_2=C<$ group and preferably having a boiling point, at atmospheric pressure, above 60° C. A wide variety of such materials are known in the art, among which the principal ones are compounds such as styrene; side chain-substituted styrenes such as α-methyl styrene, α-ethyl styrene, and the like; ring substituted styrenes such as the o-, m- and p-alkyl styrenes, e.g., o-methyl styrene, m-propyl styrene, p-ethyl styrene, 2,4-dimethyl styrene, 2,5-diethyl styrene, and the like. Still further, one can make use of allyl compounds such as diallyl phthalate, allyl acetate, allyl acrylate, allyl methacrylate, diallyl carbonate, allyl lactate, allyl α-hydroxyisobutyrate, allyl trichlorosilane, diallyl malonate, diallyl oxalate, diallyl gluconate, diallyl methyl gluconate, diallyl adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylenetetrahydrophthalic anhydride, triallyl tricarballylate, triallyltrimesate, triallyl aconitate, triallyl cyanurate, triallyl citrate, triallyl phosphate, trimethallyl phosphate, tetraallyl silane, tetraallyl silicate, hexallyl disiloxane and the like.

The ratio of the reactive polyester resin to the monomeric cross-linking agent may be varied over a wide range, and, therefore, this ratio is not critical. The reactive polyester resin content may, therefore, range from about 10 to about 90% of the total weight of the copolymerizable mixture. In the majority of applications, however, the polymerizable compositions will comprise from about 40 to 60 parts of the reactive polyester resin and correspondingly from about 60 to 40 parts of the monomeric cross-linking agent.

The diglycidyl esters which are essential to the practice of the present invention are, as previously stated, diglycidyl esters of dicarboxylic acids. One method for their preparation involves the reaction of an epihalohydrin, e.g., epichlorohydrin or epibromohydrin, with an alkaline salt, e.g., a sodium, potassium, lithium, cesium, or rubidium salt, of the particular dicarboxylic acid.

Any of the various dicarboxylic acids, whether saturated or unsaturated, referred to hereinabove in connection with the preparation of the reactive polyester resin component may also be employed in preparing the diglycidyl ester component. Of these acids phthalic, isophthalic, hexachloroendomethylenetetrahydrophthalic, and aliphatic dicarboxylic acids such as succinic, adipic, sebacic, maleic, and fumaric are preferred. Thus, diglycidyl phthalate, diglycidyl isophthalate, diglycidyl hexachloroendomethylenetetrahydrophthalate, diglycidyl succinate, diglycidyl adipate, diglycidyl sebacate, diglycidyl maleate and diglycidyl fumarate are among the preferred diglycidyl esters.

Another preferred class of diglycidyl esters is represented by the diglycidyl esters of the alkylidenedibenzoic acids corresponding to the general formula:

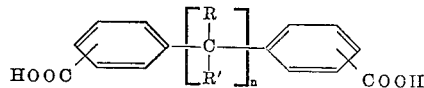

wherein R and R′ are alkyl groups containing 1 to 4 carbon atoms and $n$ is an integer of from 1 to 2. Details regarding the preparation of the 4,4′-alkylidenedibenzoic acids and their diglycidyl esters are disclosed in Australian Patent No. 222,693, issued December 11, 1959.

Among such compounds there are included the diglycidyl esters of 4,4′-isopropylidenedibenzoic acid; 4,4′-(2,2-butylidene)dibenzoic acid; 4,4′-(1,1,2,2-tetramethylethylene)dibenzoic acid; 4,4′-(1,1,2,2-tetraethylethylene)-dibenzoic acid; 4,4′-(1,1,2,2-tetrapropylethylene)dibenzoic acid; 4,4′-(1,1,2,2-tetrabutylethylene)dibenzoic acid; 3,3′-isopropylidenedibenzoic acid; 2,2′-isopropylidenedibenzoic acid; 4,4′-(1,2-diethyl-1,2-dimethylethylene)dibenzoic acid; 2,4′-(1,1,2,2-tetraethylethylene)dibenzoic acid; 2,3′-(1,1,2,2-tetrabutylethylene)dibenzoic acid; 3,4′-(2,2-butylidene)dibenzoic acid; 3,3′-(2,2-butylidene)dibenzoic acid; 2,4′-(2,2-butylidene)dibenzoic acid; 4,4′-(2,2-pentylidene)dibenzoic acid; 3,3′-(2,2-pentylidene)dibenzoic acid; 2,2′-(2,2-pentylidene)dibenzoic acid; 4,4′-(3,3-pentylidene)dibenzoic acid; 3,3′(3,3-pentylidene)dibenzoic acid; 2,4′-(3,3-pentylidene)dibenzoic acid; 4,4′-(2,2-hexylidene)dibenzoic acid; 3,3′-(2,2-hexylidene)dibenzoic acid; 2,2′-(2,2-hexylidene)dibenzoic acid; 4,4′-(3,3-hexylidene)dibenzoic acid; 4,4′-(3,3-heptylidene)dibenzoic acid; 3,4′-(3,3-heptylidene)dibenzoic acid; 4,4′-(4,4-heptylidene)dibenzoic acid; 4,4′-(4,4-octylidene)dibenzoic acid; 3,3′-(4,4-octylidene)dibenzoic acid; 2,3′-(4,4-octylidene)dibenzoic acid; 4,4′-(5,5-nonylidene)dibenzoic acid; 3,3′-(5,5-nonylidene)dibenzoic acid; and 2,4′-(5,5-nonylidene)dibenzoic acid.

I prefer to base the amount of diglycidyl ester to be used on the amount of reactive polyester resin present in the mixture. On this basis, the amount of diglycidyl ester that can be used varies over a wide range. The optimum proportion and, consequently, the preferred proportion, is an equivalent of oxirane oxygen as represented by the diglycidyl ester per equivalent of carboxyl groups of the reactive polyester resin. For convenience, the term stoichiometrical balance as employed herein refers to this preferred proportion. However, the amount of diglycidyl ester employed may range from about two equivalents to one-half equivalent or less of oxirane oxygen per equivalent of free carboxyl groups contained in the reactive polyester resin. The specific examples given hereinbelow will further serve to show those skilled in the art the best modes for practicing this invention with regard to amounts of diglycidyl ester to be used in securing the novel, cured, resinous compositions of this invention.

The method by which the reactive polyester resins, the monomeric cross-linking agents therefor, and the diglycidyl esters of this invention may be combined can be varied and presents no particular difficulty. Generally, it is desirable to heat the reactive polyester resin to a somewhat mobile state and thereupon add the requisite amount of monomeric cross-linking agent, thus forming a solution of these ingredients, and thereafter to add the diglycidyl ester and form a homogeneous solution with stirring.

In order to accelerate the copolymerization of the monomeric cross-linking agent with the reactive polyester resin, it is preferred that a polymerization catalyst be incorporated in the composition, which in this instance includes the diglycidyl ester.

The preferred polymerization catalysts are of the free radical type, for example the organic superoxides, i.e., the organic peroxides ("acidic peroxides") and hydroperoxides ("alcoholic peroxides"). Among these preferred catalysts there may be mentioned acetyl peroxide, benzoyl peroxide, phthalyl peroxide, succinyl peroxide, benzoyl acetyl peroxide, tertiary butyl hydroperoxide, cumene hydroperoxide, and the terpene oxides, e.g., ascardiole, and the like. Other free radical polymerization catalysts which may be employed are compounds such as aluminum chloride, stannic chloride, boron trifluoride, and the azo type catalysts, such as azodibutyronitrile.

The concentration of catalyst employed is usually small, i.e., for the preferred catalysts, from about one part catalyst per one thousand parts of the mixture of materials to be polymerized (excluding the diglycidyl ester component) to about two parts per one hundred parts of said mixture. If a polymerization inhibitor, i.e., an agent which will impart some measure of stability to the polymerizable mixture and yet not affect the polymerization reaction once it has been initiated by the addition of catalyst or by heating, is present, up to 5% or more by weight of the catalyst, based on the weight of the reactive polyester resin and the monomeric cross-linking agent, may be necessary, depending upon the inhibiting capacity of the inhibitor employed.

Among the polymerization inhibitors which may be employed are such compounds as the polyhydric phenols, e.g., hydroquinone, and the like. The concentration of inhibitor is preferably low; usually less than about 1% by weight, based on the weight of reactive polyester resin and cross-linking monomer, is sufficient. The preferred inhibitors, i.e., the polyhydric phenols, will be employed in amounts ranging from about 0.01 to about 0.1%. The inhibitor is generally incorporated into the composition at the time the reactive polyester resin is dissolved in the monomeric cross-linking agent. However, an inhibitor such as hydroquinone may be advantageously present during the preparation of the reactive polyester resin.

As mentioned above, the compositions of this invention are brought to a state of total cure by a two-step process. In the first step, copolymerization between the monomeric cross-linking agent and the reactive polyester resin is effected. This is accomplished by heating a homogeneous mixture of all three components (monomeric cross-linking agent, reactive polyester resin, and diglycidyl ester) in the presence of a catalyst at an elevated temperature, usually in the range of from about 80° C. to 120° C., for a period of time ranging from about ten minutes to two hours. As a result of the initial curing step, the resinifying mixture contains an insoluble, infusible polymeric component derived from the copolymerization of the reactive polyester resin with the cross-linking monomer, and also contains the diglycidyl ester component in an essentially uncombined form homogeneously distributed throughout the entire composition. After the initial copolymerization between the reactive polyester resin and the monomeric cross-linking agent has been effected, the composition is then heated to higher temperatures, usually in the range of from about 120° C. to 250° C. It is in this latter or post-curing step that the diglycidyl ester is effectively caused to react with the polymer formed in the first step, with the result that the extremely cross-linked resinous material obtained exhibits superior properties which are not obtainable by the initial copolymerization reaction alone. Depending on the temperature and specific resinous composition, the time required to effect the desired degree of post-cure may range from about fifteen minutes to five hours, although a majority of the resinous compositions of the present invention will be adequately post-cured by employing reaction times ranging from about fifteen minutes to three hours.

As previously stated, the compositions of this invention are suitable for use in laminating, in the preparation of adhesives, and in the preparation of surface coatings and castings. Conventional laminating procedures can be used to prepare laminates from these compositions, and both filled and unfilled castings are also prepared from these compositions in the conventional manner. Besides conventional fillers and reinforcements, other known additives, such as catalyst promoters, mold lubricants, colorants, flow promoters, ultraviolet absorbing compounds, and the like, may be incorporated in the polymerizabe compositions of the present invention.

In order that those skilled in the art may better understand how the present invention may be practiced, the following examples are given. These examples are set forth solely for the purpose of illustration and any specific enumeration of details contained therein should not be interpreted as expressing limitations unless so set forth in the appended claims. All parts and percentages are by weight, unless otherwise stated.

PREPARATION OF RESIN A 96 parts of maleic anhydride and 152 parts of propylene glycol were charged to a suitable reaction vessel equipped with a stirrer, thermometer, and inert gas inlet tube. The reaction mixture, with carbon dioxide gas passing beneath its surface, was heated with stirring to 190° C. When the reaction was complete, as indicated by an acid number of approximately three, the reaction mixture was cooled to about 150° C. and 192 parts of maleic anhydride were added to the reaction vessel. The exotherm which developed as a result of the added maleic anhydride reacting with the initial esterification product was allowed to run its course. In this instance, the maximum exotherm temperature was in the neighborhood of 170° C. (if the addition of the maleic anhydride at this point results in a peak exotherm substantially in excess of 170° C., it is desirable to cool the reaction mixture so as not to permit the reaction temperature to exceed about 190° C.). When the exotherm had ceased, the reaction mixture was heated for approximately thirty minutes, at which time the acid number reached 265, indicating the substantial utilization of the hydroxyl groups present. The resin was then cooled to about 80° C. and discharged from the reaction vessel. The product was a very viscous mass at room temperature and exhibited a light amber color.

PREPARATION OF RESIN B

Into a suitable reaction vessel, equipped in the same manner as the vessel used in the preparation of resin A, were charged 62 parts of ethylene glycol, 96 parts of maleic anhydride and 148 parts of phthalic anhydride. The reaction mixture was heated with stirring to a temperature of 180° C., with inert gas passing beneath the surface of the reaction mixture. The esterification reaction was allowed to proceed at this temperature for approximately three hours, until the acid number of the reaction product reached 182, which value corresponds to the substantially complete utilization of the hydroxyl groups of the glycol charge. The product was cooled and then discharged from the reaction vessel.

PREPARATION OF RESIN C 3.4 parts of glycerine, 94 parts of neopentyl glycol and 116 parts of fumaric acid were charged to a suitable reaction vessel, equipped in the same manner as the vessels used in the preparation of resins A and B. The reaction mixture, with carbon dioxide gas passing beneath its surface, was heated with stirring to a temperature of 195° C. The esterification reaction was continued at this temperature until an acid number of approximately 100 was obtained. Thereupon, the resin was rapidly cooled to 90° C. and discharged from the reaction vessel.

Example 1

Resin A was blended with styrene and diglycidyl phthalate to yield polyester resin compositions corresponding to formulations "D" and "E" set forth in the following table:

TABLE I

| Polyester Composition | D | E | F |
|---|---|---|---|
| Resin A | 200 | 200 | |
| Polyester Resin [1] | | | 200 |
| Styrene | 86 | 86 | 79 |
| Diglycidyl phthalate | 150 | 100 | |

[1] Esterification product prepared from one mol of maleic anhydride and 1.1 mol of propylene glycol and having an acid number of 35.

200 parts of resin A represent one equivalent weight of this resin. In other words, 200 grams of this resin represent one gram equivalent of carboxyl groups. 150 parts of the diglycidyl phthalate employed in this instance represent one gram equivalent of oxirane groups. Therefore, in polyester composition "D," there is a stoichiometrical balance between the resin and the diglycidyl compound. In composition "E," the amount of diglycidyl compound employed represents approximately 70% of this stoichiometrical requirement. Composition "F" is a typical resin-styrene polyester resinous composition and represents the closest conventional composition to that of composition "D."

Each of the compositions listed in Table I, catalyzed with 1% Luperco ATC (50% benzoyl peroxide-50% tricresylphosphate), was used to prepare glass fiber-reinforced laminates. The procedure employed in preparing the laminates consisted of placing a piece of 181–136 type glass cloth on a sheet of cellophane. A predetermined quantity of resin was poured onto the cloth and spread out uniformly. This procedure was repeated with successive layers of cloth until a 12-ply lay-up was obtained. Thereupon, the lay-up was covered with a piece of cellophane, and entrapped air was removed by wiping the surface of the assembly with a rigid, flat piece of plastic. The assembly was then placed into a hot press (230° F.) for ten minutes at 15 p.s.i. In preparing laminates from polyester compositions "D" and "E," the laminates were, after removal from the press, post-cured in an oven for two hours at 356° F.

All laminates were tested for flexural strength and tensile strength characteristics. The laminates prepared from the compositions containing the diglycidyl ester were decidedly superior to the laminate prepared from composition "F" in flexural and tensile strength properties. However, the laminate prepared from polyester resin composition "D" was somewhat superior in these properties to the laminate prepared from polyester composition "E."

Example 2

Resin B, having a carboxy equivalent of about 308, was blended with diallyl phthalate and diglycidyl maleate in the proportions indicated for the polyester compositions "G" and "H" listed in Table II below. Composition "G" represents a stoichiometrical amount of the glycidyl ester for the polyester resin (resin B). The composition "H" is a formulation containing approximately a 15% excess of the diglycidyl ester over the stoichiometrical requirement for the reactive resin component thereof. Composition "I" is a conventional polyester composition recipe corresponding to the modified compositions.

TABLE II

| Polyester Composition | G | H | I |
|---|---|---|---|
| Resin B | 308 | 308 | |
| Polyester Resin [1] | | | 490 |
| Diallyl phthalate | 132 | 132 | 210 |
| Diglycidyl maleate | 120 | 140 | |

[1] Esterification product of one mol of maleic anhydride, one mol of phthalic anhydride and two mols of ethylene glycol having an acid number of 60.

Each of the polyester compositions listed in Table II was catalyzed with 1% Luperco ATC based on total solids. The catalyzed resins were poured between two Herculite glass plates separated by one-eighth inch thick rubber gasket material. The resins were cured by heating in a forced draft oven for two hours at 250° F. The castings containing the compositions "G" and "H" were further heated for two hours at 400° F.

Conventional testing procedures indicated that the castings prepared from polyester compositions "G" and "H" were superior in flexural strength and flexural modulus at elevated temperatures to the casting prepared from the conventional polyester resin composition designated "I" in Table II.

Example 3

Resin C was blended with styrene and various diglycidyl esters in the manner indicated in the following table:

TABLE III

| Polyester Composition | J | K | L |
|---|---|---|---|
| Resin C | 561 | 561 | 561 |
| Styrene | 75 | 100 | 125 |
| Diglycidyl isophthalate | 140 | | |
| Diglycidyl adipate | | 140 | |
| Diglycidyl sebacate | | | 160 |

Each of the compositions was catalyzed with 1% benzoyl peroxide, based on total solids, and cured in the presence of glass and metal. In each instance the cured compositions exhibited excellent adhesion to these substrates.

Example 4

Polyester resin compositions corresponding to formulations "M" and "N" set forth in Table IV below were prepared by blending resin A with styrene and the diglycidyl ester of 4,4'-(2,2-butylidene)dibenzoic acid.

TABLE IV

| Polyester Composition | M | N | O |
|---|---|---|---|
| Resin A | 200 | 200 | |
| Polyester Resin [1] | | | 200 |
| Styrene | 86 | 86 | 79 |
| DGBBA [2] | 245 | 175 | |

[1] Esterification product prepared from one mol of maleic anhydride and 1.1 mol of propylene glycol and having an acid number of 35.
[2] DGBBA—Diglycidyl ester of 4,4'-(2,2-butylidene)dibenzoic acid.

200 parts of resin A represent one equivalent weight of this resin, while 245 parts of the diglycidyl ester of the butylidenedibenzoic acid represent one gram equivalent of oxirane groups. Therefore, in polyester composition "M," there is a stoichiometrical balance between the resin and the diglycidyl compound. In composition "N," the amount of diglycidyl compound employed represents approximately 70% of the stoichiometrical requirement. Composition "O" is a typical styrene-polyester resinous composition and represents the closest conventional composition to that of composition "M."

The compositions listed in Table IV, each catalyzed with 1% Luperco ATC (50% benzoyl peroxide–50% tricresylphosphate), were used to prepare glass fiber-reinforced laminates. The procedure employed in preparing the laminates was the same as that described in Example 1 above, i.e., 181–136 glass cloth was used to prepare 12-ply lay-ups, and the lay-ups were initially cured in a hot press (230° F.) for ten minutes at 15 p.s.i. The laminates prepared from polyester compositions "M" and "N," after removal from the press, were post-cured in an oven for two hours at 356° F.

In testing all the laminates for flexural strength and tensile strength characteristics, it was observed that the laminates prepared from the compositions containing the diglycidyl ester were markedly superior to the laminate prepared from composition "O" in these properties. It was also observed that the laminate prepared from polyester resin composition "M" was somewhat superior in flexural and tensile strength to the laminate prepared from polyester composition "N."

*Example 5*

Resin B was blended with diallyl phthalate and the diglycidyl ester of 4,4'-isopropylidenedibenzoic acid in the proportions indicated for the polyester compositions "P" and "Q" listed in Table V below. Composition "P" represents a stoichiometrical amount of the glycidyl ester for the polyester resin (resin B). The composition "Q" is a formulation containing approximately a 25% excess of the diglycidyl ester over the stoichiometrical requirement for the reactive resin component thereof. Composition "R" is a conventional polyester composition recipe corresponding to the modified compositions.

TABLE V

| Polyester Composition | P | Q | R |
|---|---|---|---|
| Resin B | 308 | 308 | |
| Polyester Resin [1] | | | 490 |
| Diallyl phthalate | 132 | 132 | 210 |
| DGPBA [2] | 245 | 300 | |

[1] Esterification product identical in composition with resin B having and acid number of 60.
[2] DGPBA—Diglycidyl ester of 4,4'-isopropylidene-dibenzoic acid.

Samples of the polyester compositions listed in Table V, catalyzed with 1% Luperco ATC based on total solids, were each poured between two Herculite glass plates separated by one-eighth inch thick rubber gasket material and cured by heating in a forced draft oven for two hours at 250° F. The castings containing the compositions "P" and "Q" were further heated for two hours at 400° F.

The castings prepared from polyester compositions "P" and "Q," when subjected to conventional testing procedures, were superior in flexural strength and flexural modulus at elevated temperatures to the casting prepared from the conventional polyester resin composition designated "R" in Table V.

*Example 6*

Blends of resin C with styrene and various diglycidyl esters were formulated in the manner indicated in the following table:

TABLE VI

| Polyester Composition | S | T | U |
|---|---|---|---|
| Resin C | 561 | 561 | 561 |
| Styrene | 100 | 50 | 125 |
| Diglycidyl ester of 4,4'-(3,3-pentylidene)-dibenzoic acid | 260 | | |
| Diglycidyl ester of 4,4'-(1,1,2,2-tetramethyl ethylene)dibenzoic acid | | 260 | |
| Diglycidyl ester of 4,4'-(1,1,2,2-tetramethyl ethylene)dibenzoic acid | | | 260 |

Each of the compositions listed in Table VI, when catalyzed with 1% benzoyl peroxide (based on total solids) and cured in the presence of glass and metal, exhibited excellent adhesion to these substrates.

It will be obvious that other changes and variations may be made in carrying out the present invention without departing from the spirit and scope thereof as defined in the appended claims.

I claim:

1. A process for preparing a resinous composition of matter which comprises polymerizing, in the presence of a free radical polymerization catalyst, a homogeneous mixture of (1) an ethylenically unsaturated polyester resin, obtained by esterifying an $\alpha,\beta$-ethylenically unsaturated dicarboxylic acid with a dihydric alcohol, (2) a monomeric cross-linking agent for (1) containing a $CH_2=C<$ group and having a boiling point, at atmospheric pressure, above 60° C., and (3) a diglycidyl ester of a dicarboxylic acid, whereby an insoluble, infusible polymer of (1) and (2) is formed, and thereupon reacting the aggregate of said polymer and (3) at a temperature of from about 120° C. to 250° C. until the reaction product of said aggregate is insoluble and infusible.

2. A process for preparing a resinous composition of matter which comprises polymerizing, in the presence of a free radical polymerization catalyst, a homogeneous mixture of (1) an ethylenically unsaturated polyester resin, obtained by esterifying an $\alpha,\beta$-ethylenically unsaturated dicarboxylic acid with a dihydric alcohol, (2) a monomeric cross-linking agent for (1) containing a $CH_2=C<$ group and having a boiling point, at atmospheric pressure, above 60° C., and (3) a diglycidyl phthalate, whereby an insoluble, infusible polymer of (1) and (2) is formed, and thereupon reacting the aggregate of said polymer and (3) at a temperature of from about 120° C. to 250° C. until the reaction product of said aggregate is insoluble and infusible.

3. A process for preparing a resinous composition of matter which comprises polymerizing, in the presence of a free radical polymerization catalyst, a homogeneous mixture of (1) an ethylenically unsaturated polyester resin, obtained by esterifying an $\alpha,\beta$-ethylenically unsaturated dicarboxylic acid with a dihydric alcohol, (2) a monomeric cross-linking agent for (1) containing a $CH_2=C<$ group and having a boiling point, at atmospheric pressure, above 60° C., and (3) a diglycidyl ester of an aliphatic dicarboxylic acid, whereby an insoluble, infusible polymer of (1) and (2) is formed, and thereupon reacting the aggregate of said polymer and (3) at a temperature of from about 120° C. to 250° C. until the reaction product of said aggregate is insoluble and infusible.

4. A process for preparing a resinous composition of matter which comprises polymerizing, in the presence of a free radical polymerization catalyst, a homogeneous mixture of (1) an ethylenically unsaturated polyester resin, obtained by esterifying an $\alpha,\beta$-ethylenically unsaturated dicarboxylic acid with a dihydric alcohol, (2) a monomeric cross-linking agent for (1) containing a $CH_2=C<$ group and having a boiling point, at atmospheric pressure, above 60° C., and (3) diglycidyl maleate, whereby an insoluble, infusible polymer of (1) and (2) is formed, and thereupon reacting the aggregate of said polymer and (3) at a temperature of from about 120° C. to 250° C. until the reaction product of said aggregate is insoluble and infusible.

5. A process for preparing a resinous composition of matter which comprises polymerizing, in the presence of a free radical polymerization catalyst, a homogeneous mixture of (1) an ethylenically unsaturated polyester resin, obtained by esterifying an $\alpha,\beta$-ethylenically unsaturated dicarboxylic acid with a dihydric alcohol, (2) a monomeric cross-linking agent for (1) containing a $CH_2=C<$ group and having a boiling point, at atmospheric pressure, above 60° C., and (3) a diglycidyl ester of an alkylidenedibenzoic acid corresponding to the general formula:

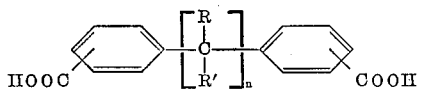

wherein R and R' are alkyl groups containing 1 to 4 carbon atoms and $n$ is an integer of from 1 to 2, whereby an insoluble, infusible polymer of (1) and (2) is formed, and thereupon reacting the aggregate of said polymer and (3) at a temperature of from about 120° C. to 250° C. until the reaction product of said aggregate is insoluble and infusible.

6. A process for preparing a resinous composition of matter which comprises polymerizing, in the presence of a free radical polymerization catalyst, a homogeneous mixture of (1) an ethylenically unsaturated polyester resin, obtained by esterifying an $\alpha,\beta$-ethylenically unsaturated dicarboxylic acid with a dihydric alcohol, (2) a monomeric cross-linking agent for (1) containing a $CH_2=C<$ group and having a boiling point, at atmospheric pressure, above 60° C., and (3) a diglycidyl ester of 4,4'-isopropylidenedibenzoic acid, whereby an insoluble, infusible polymer of (1) and (2) is formed, and thereupon reacting the aggregate of said polymer and (3) at a temperature of from about 120° C. to 250° C. until the reaction product of said aggregate is insoluble and infusible.

7. A polymerizable composition of matter comprising (1) an ethylenically unsaturated polyester resin, obtained by esterifying an $\alpha,\beta$-ethylenically unsaturated dicarboxylic acid with a dihydric alcohol, (2) a monomeric cross-linking agent for (1) containing a $CH_2=C<$ group and having a boiling point, at atmospheric pressure, above 60° C., and (3) a diglycidyl ester of a dicarboxylic acid.

8. A polymerizable composition of matter comprising (1) an ethylenically unsaturated polyester resin, obtained by esterifying an $\alpha,\beta$-ethylenically unsaturated dicarboxylic acid with a dihydric alcohol, (2) a monomeric cross-linking agent for (1) containing a $CH_2=C<$ group and having a boiling point, at atmospheric pressure, above 60° C., and (3) a diglycidyl phthalate.

9. A polymerizable composition of matter comprising (1) an ethylenically unsaturated polyester resin, obtained by esterifying an $\alpha,\beta$-ethylenically unsaturated dicarboxylic acid with a dihydric alcohol, (2) a monomeric cross-linking agent for (1) containing a $CH_2=C<$ group and having a boiling point, at atmospheric pressure, above 60° C., and (3) a diglycidyl ester of an aliphatic dicarboxylic acid.

10. A polymerizable composition of matter comprising (1) an ethylenically unsaturated polyester resin, obtained by esterifying an $\alpha,\beta$-ethylenically unsaturated dicarboxylic acid with a dihydric alcohol, (2) a monomeric cross-linking agent for (1) containing a $CH_2=C<$ group and having a boiling point, at atmospheric pressure, above 60° C., and (3) diglycidyl maleate.

11. A polymerizable composition of matter comprising (1) an ethylenically unsaturated polyester resin, obtained by esterifying an $\alpha,\beta$-ethylenically unsaturated dicarboxylic acid with a dihydric alcohol, (2) a monomeric cross-linking agent for (1) containing a $CH_2=C<$ group and having a boiling point, at atmospheric pressure, above 60° C., and (3) a diglycidyl ester of an alkylidene-dibenzoic acid corresponding to the general formula:

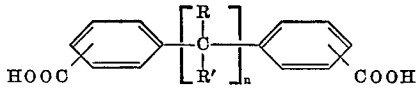

wherein R and R' are alkyl groups containing 1 to 4 carbon atoms and $n$ is an integer of from 1 to 2.

12. A polymerizable composition of matter comprising (1) an ethylenically unsaturated polyester resin, obtained by esterifying an $\alpha,\beta$-ethylenically unsaturated dicarboxylic acid with a dihydric alcohol, (2) a monomeric cross-linking agent for (1) containing a $CH_2=C<$ group and having a boiling point, at atmospheric pressure, above 60° C., and (3) a diglycidyl ester of 4,4'-isopropylidenedibenzoic acid.

13. An insoluble, infusible resinous composition of matter obtained by polymerizing (1) an ethylenically unsaturated polyester resin, obtained by esterifying an $\alpha,\beta$-ethylenically unsaturated dicarboxylic acid with a dihydric alcohol, (2) a monomeric cross-linking agent for (1) containing a $CH_2=C<$ group and having a boiling point, at atmospheric pressure, above 60° C., and (3) a diglycidyl ester of a dicarboxylic acid.

14. An insoluble, infusible resinous composition of matter obtained by polymerizing (1) an ethylenically unsaturated polyester resin, obtained by esterifying an $\alpha,\beta$-ethylenically unsaturated dicarboxylic acid with a dihydric alcohol, (2) a monomeric cross-linking agent for (1) containing a $CH_2=C<$ group and having a boiling point, at atmospheric pressure, above 60° C., and (3) a diglycidyl phthalate.

15. An insoluble, infusible resinous composition of matter obtained by polymerizing (1) an ethylenically unsaturated polyester resin, obtained by esterifying an $\alpha,\beta$-ethylenically unsaturated dicarboxylic acid with a dihydric alcohol, (2) a monomeric cross-linking agent for (1) containing a $CH_2=C<$ group and having a boiling point, at atmospheric pressure, above 60° C., and (3) a diglycidyl ester of an aliphatic dicarboxylic acid.

16. An insoluble, infusible resinous composition of matter obtained by polymerizing (1) an ethylenically unsaturated polyester resin, obtained by esterifying an $\alpha,\beta$-ethylenically unsaturated dicarboxylic acid with a dihydric alcohol, (2) a monomeric cross-linking agent for (1) containing a $CH_2=C<$ group and having a boiling point, at atmospheric pressure, above 60° C., and (3) diglycidyl maleate.

17. An insoluble, infusible resinous composition of matter obtained by polymerizing (1) an ethylenically unsaturated polyester resin, obtained by esterifying an $\alpha,\beta$-ethylenically unsaturated dicarboxylic acid with a dihydric alcohol, (2) a monomeric cross-linking agent for (1) containing a $CH_2=C<$ group and having a boiling point, at atmospheric pressure, above 60° C., and (3) a diglycidyl ester of an alkylidenedibenzoic acid corresponding to the general formula:

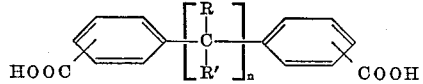

wherein R and R' are alkyl groups containing 1 to 4 carbon atoms and $n$ is an integer of from 1 to 2.

18. An insoluble, infusible resinous composition of matter obtained by polymerizing (1) an ethylenically unsaturated polyester resin, obtained by esterifying an $\alpha,\beta$-ethylenically unsaturated dicarboxylic acid with a dihydric alcohol, (2) a monomeric cross-linking agent for (1) containing a $CH_2=C<$ group and having a boiling point, at atmospheric pressure, above 60° C., and (3) a diglycidyl ester of 4,4'-isopropylidenedibenzoic acid.

References Cited in the file of this patent

UNITED STATES PATENTS

| 2,691,007 | Cass | Oct. 5, 1954 |
| 2,781,333 | Updegraff | Feb. 12, 1957 |
| 2,859,199 | Parker | Nov. 4, 1958 |

FOREIGN PATENTS

| 1,123,634 | France | Sept. 25, 1956 |